Jan. 20, 1959 W. SIEPMANN 2,869,221
METHOD OF PRODUCING VALVE HOUSINGS
Filed Oct. 20, 1953
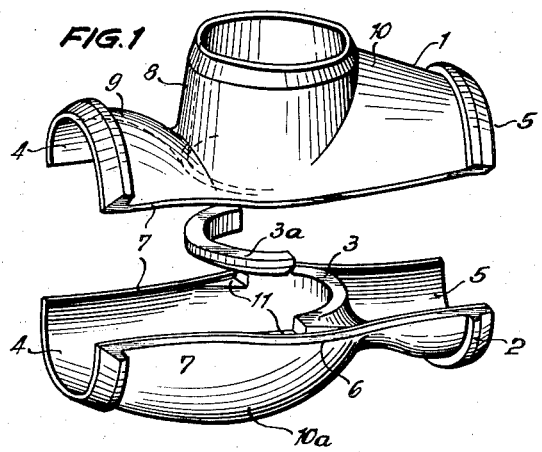
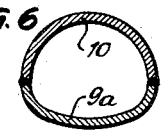
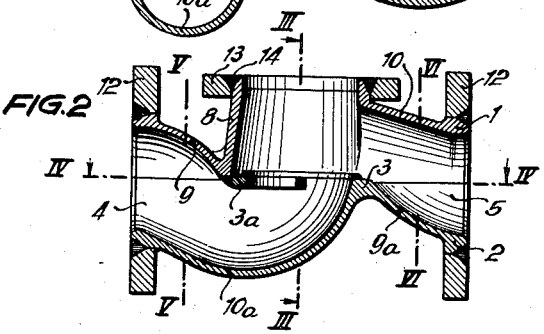
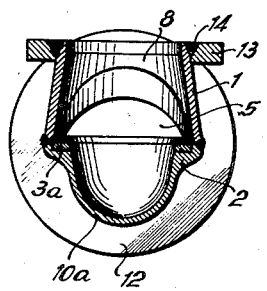
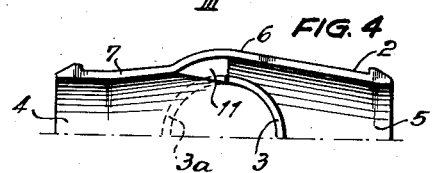
INVENTOR
WALTER SIEPMANN
By: Young, Emery & Thompson
Attys.

United States Patent Office 2,869,221
Patented Jan. 20, 1959

2,869,221

METHOD OF PRODUCING VALVE HOUSINGS

Walter Siepmann, Belecke, Germany, assignor to Stahl-Armaturen G. m. b. H., Belecke (Mohne), Germany Application October 20, 1953, Serial No. 387,273

Claims priority, application Germany October 21, 1952

2 Claims. (Cl. 29—157.1)

This invention relates to a method of producing valve housings.

Recently valves have been successfully introduced in practice, the housing of which is composed of two shell-shaped, die-forged halves which are welded together along the plane of the die joint which extends through the coaxial mouths of the inlet and outlet passages. Even in the case of larger dimensions, that is the nominal width of the valve, it is possible, by using suitable dies, to forge thin-walled shells provided with the necessary ribs, reinforcements or valve seat parts. Such die-forged housing shells are very strong. The welding of the housing halves is carried out on butt-welding machines by the flash welding process. But other known welding processes might also be used.

The invention is based on the above described idea of producing a valve housing from two die-forged, shell-shaped halves. It has been recognized that the valve housing will be improved in shape and at the same time its production will be simplified by making, according to the invention, the die jointing plane between the housing halves parallel or substantially parallel to the plane of the valve seat and the valve seat or its carrier as a section of a ring, preferably half a ring, which is connected to the lower part of the housing, the other half of the ring being brought into the required position after the body halves have been forged. The two halves of the valve body or housing are not symmetrical in shape, but a very important advantage of this particular arrangement of the jointing plane is that the weld seam extends almost in a straight line and that there are only two longitudinal seams, identical in shape. These almost straight welds can be carried out reliably by various known welding processes. It is known that, particularly in the case of valves composed of several housing parts, it is difficult to obtain perfectly tight, that is X-ray-proof seams. The invention enables the production of uniform seams and a good weld connection, especially by employing automatic arc welding, namely the powder covering process (Unimelt process), because the welded seam can be run in a straight line under the electrode without complicated equipment, without the liquid metal from the melted powder running out of the seam. The differences in height of the seam located in the axis of the electrode but which are not always necessary are insignificant and are equalized by the movement of the electrode itself. The production of a very good welded seam is thus rendered possible in a comparatively simple manner. The invention is applicable for valves with the widest range of nominal diameters, namely especially large housings.

As a result of the jointing plane being located in a particular position, the ring forming the valve seat or the carrier for such a valve seat ring cannot be made in one piece with a shell-shaped housing part. Consequently, according to the invention, only half the ring or its carrier is forged with the lower housing half, whereas the other corresponding part of the ring can be made separately and welded in the upper half of the housing, that is in the lower part of the valve cone compartment before the two halves of the housing are welded together. Another advantageous method of production consists in that the second ring half is formed by a rib projecting after the welding of the housing halves and subsequently bent towards the valve cone chamber. Both housing halves, including the ring halves required for the valve seat, are die-forged. This ring half of the valve seat enables the method of producing the valve housing to be carried out in a particularly advantageous manner, in that, after the two halves of the housing have been placed the one on the other, the two shell-shaped components adhere so tightly together, owing to the welding of the joints between the half rings, that the longitudinal seams of the housing can be subsequently welded without any difficulty in the automatic welding machine. In the welded housing the valve seat ring is, in a certain sense, clamped between the top and bottom parts and fixed in position. The sealing surface proper is formed by welding on a suitable metal, particularly a hard metal, and subsequently finishing the same.

The invention is illustrated by way of example in the accompanying drawings, in which Figs. 1 to 6 show the first form of construction, Fig. 1 being a perspective view showing the two housing parts and the half ring necessary for forming the valve seat, Fig. 2 a longitudinal section through the finished valve housing, Fig. 3 a cross section on line III—III of Fig. 2, Fig. 4 a cross section on line IV—IV of Fig. 2, Fig. 5 a cross section on line V—V of Fig. 2, and Fig. 6 a cross section on line VI—VI of Fig. 2.

The valve housing shown in Fig. 1 is composed of two halves 1 and 2 produced by die-forging. The dies are so constructed that a rod of material is deformed chiefly in width and first fills the mould before the excess material overflows into the seam or fin of the pressing or forging. In this manner forgings are produced with thin wall thicknesses and the necessary ribs, reinforcements, depressions and the like.

In the valve housing according to the invention, the jointing plane which is the die joint line, lies parallel to the plane of the valve seat. The valve seat composed of two half rings 3, 3a may lie slightly above or below the jointing plane of the two housing halves. A slightly higher position is preferred. In many instances, however, the plane of the valve seat and the jointing plane of the two housing halves 1 and 2 may coincide. With the jointing plane thus located, the inlet and outlet passages 4 and 5 are of approximately constant width along their entire length at about the height of the valve seat. In the valve seat area only the side wall is pressed outwards slightly, forming the bulge 6. The edges 7 to be welded therefore extend substantially in a straight line in the longitudinal direction of the housing, so that, when the halves are fitted together, the seam can be produced in an automatic welding machine under an electrode. The electrode itself equalizes the slight differences in height in moving backwards and forwards during the welding operation. However, it is also possible to make the walls of the housing halves in proximity to the edges, of such thickness that the outer surface of the seam runs in an absolutely straight line. Both the edges 7 accurately coincide, so that the production of the seam on an automatic welding machine can be carried out economically.

The upper housing half 1 has a tubular projection 8 which widens conically towards the valve seat. The greatest diameter of the valve cone chamber is located near the valve seat. In the case of the inlet passage the upper wall 9 is flattened as shown in Fig. 5. The upper wall portion 10 of the outlet passage is arched to a greater extent than at the mouth of the passage. In the lower shell 2 the more strongly arched portion 10a is on the inlet side, whereas the flattened portion 9a is on the outlet side. The medium flow through the valve seat is greatly facilitated by the local increase in the size of the arch and by the widening of the passage, and at the same time the enlarged valve cone chamber in the lower part ensures a good guiding of the medium.

A half ring 3 of the valve seat or its carrier is forged in the lower housing half 2. Small brackets 11 are forged on the inner side of the housing wall at the two ends of the half ring. In the example illustrated in Figs. 1 to 6 the half ring 3a is made as a separate part and welded in the upper housing half 1 near the valve cone chamber, as can be seen from Fig. 2. This welding is carried out before the parts 1 and 2 are joined.

When the housing halves 1 and 2 have been fitted together with their edges to be welded in contact, the joint between the half ring 3a and the forged-in half ring (see Fig. 4) is closed by welding. During this operation, the ends of the half ring 3a rest on the brackets 11. At the same time the two halves 1 and 2 adhere tightly so that the seams formed between the edges 7 can be welded on an automatic welder.

In all forms of construction according to the invention the ends of the inlet and outlet passages have connection flanges. The projection from the housing also has a flange 13 for the valve coverplate. The flanges are connected to the parts of the housing by welded seams 14 which, being on the end faces, can be produced in a simple manner on automatic welding machines. At the same time the welded seams are used for forming the packing surfaces.

In the case of large dimensioned valve housings the two halves are forged separately. When producing small dimensioned valve housings, several lower parts and several upper parts can be arranged end to end and forged in a single operation. When the half rings of the valve seats have been welded-in and the upper and lower parts connected, the lateral seams, which then extend along several valve housings, can be welded in one pass. The individual housings are then separated by sawing.

I claim:

1. Method of producing valve housings of the type described, consisting in forging a half valve seat and two shell-shaped housing half sections with longitudinal edges and one of the housing half sections having a half valve seat integral therewith, welding said first-mentioned half valve seat in the housing half section which does not have the half seat as a part thereof, the welding of said first-mentioned half valve seat being such that its upper surface lies in the same plane as the upper surface of the integral half valve seat when said edges are joined, fitting the two housing half sections together with the two half seats in abutting relationship and welding the joint therebetween, with the abutting ends of the half valve seats in a plane at right angles to the longitudinal axis of the sections and welding the longitudinal edges of the housing to form seams.

2. A method as set forth in claim 1, in which the final welding operation is carried out by use of the arc welding process.

References Cited in the file of this patent

UNITED STATES PATENTS

| 1,067,259 | Lamping | July 15, 1913 |

FOREIGN PATENTS

| 303,590 | Great Britain | Jan. 10, 1929 |
| 46,578 | France | Apr. 28, 1936 |
| 489,602 | Great Britain | July 29, 1938 |
| 522,126 | Great Britain | June 10, 1940 |
| 748,584 | Germany | Jan. 26, 1953 |